(12) United States Patent
Nakamura et al.

(10) Patent No.: US 8,651,526 B2
(45) Date of Patent: Feb. 18, 2014

(54) STEERING APPARATUS

(75) Inventors: Yasuhiro Nakamura, Nabari (JP); Keiji Kishimoto, Kashihara (JP); Kazuyuki Tamenaga, Nara (JP); Takeshi Matsuda, Hamamatsu (JP); Hiroji Nagano, Toyohashi (JP); Kazuyoshi Wakabayashi, Kasugai (JP); Shigeru Hoshino, Toyota (JP); Tomokazu Fujita, Kosai (JP)

(73) Assignees: JTEKT Corporation, Osaka-Shi (JP); Fuji Kiko Co., Ltd., Kosai-Shi (JP)

( * ) Notice: Subject to any disclaimer, the term of this patent is extended or adjusted under 35 U.S.C. 154(b) by 390 days.

(21) Appl. No.: 13/049,309

(22) Filed: Mar. 16, 2011

(65) Prior Publication Data
US 2011/0227322 A1 Sep. 22, 2011

(30) Foreign Application Priority Data
Mar. 19, 2010 (JP) ................................. 2010-064418

(51) Int. Cl.
*B62D 1/11* (2006.01)
*B62D 1/18* (2006.01)

(52) U.S. Cl.
USPC .............. 280/777; 280/775; 74/492; 74/493

(58) Field of Classification Search
USPC .......................... 280/777, 775; 297/492, 493
See application file for complete search history.

(56) References Cited

U.S. PATENT DOCUMENTS

| | | | |
|---|---|---|---|
| 7,165,787 B1 * | 1/2007 | Go ................................ | 280/777 |
| 7,258,365 B2 * | 8/2007 | Kahlenberg et al. .......... | 280/775 |
| 7,360,793 B2 * | 4/2008 | Hoshino et al. ............... | 280/777 |
| 7,625,009 B2 * | 12/2009 | Ridgway et al. .............. | 280/777 |
| 7,635,149 B2 * | 12/2009 | Menjak et al. ................. | 280/775 |
| 2006/0043722 A1 * | 3/2006 | Hoshino et al. ............... | 280/777 |
| 2008/0087130 A1 * | 4/2008 | Beneker et al. ................ | 74/493 |
| 2011/0227322 A1 * | 9/2011 | Nakamura et al. ............ | 280/777 |

FOREIGN PATENT DOCUMENTS

| | | |
|---|---|---|
| EP | 1 955 923 A2 | 8/2008 |
| JP | A-2006-62434 | 3/2006 |
| JP | A-2009-51353 | 3/2009 |
| WO | WO 2010/026552 A2 | 3/2010 |

OTHER PUBLICATIONS

European Search Report dated Dec. 21, 2011 issued in European Patent Application No. 11158775.4.

* cited by examiner

*Primary Examiner* — Drew Brown
(74) *Attorney, Agent, or Firm* — Oliff PLC (57) ABSTRACT

In a steering apparatus, an upper bracket that supports a steering column is configured as a breakaway bracket, and has a telescopic adjustment function that allows the steering wheel position to be adjusted in the axial direction of the steering column. The upper bracket has a first through-hole extending through the upper bracket in the axial direction. The upper bracket is provided with a guide rail 7 that has a fixed portion and a body portion. The fixed portion is fixed to a mounting stay. The body portion extends from the fixed portion toward the front of a vehicle in the axial direction, and is inserted in the first through-hole.

3 Claims, 9 Drawing Sheets

STEERING APPARATUS

INCORPORATION BY REFERENCE

The disclosure of Japanese Patent Application No. 2010-064418 filed on Mar. 19, 2010 including the specification, drawings and abstract is incorporated herein by reference in its entirety.

BACKGROUND OF THE INVENTION

1. Field of the Invention

The invention relates to a vehicle steering apparatus.

2. Description of Related Art

There is an existing vehicle steering apparatus that is, for example, configured such that, when a vehicle collides at its front and then the driver collides with a steering wheel due to the action of inertia (secondary collision), a steering column that rotatably supports a steering shaft is removed from a vehicle body member in order to, for example, absorb the shock. Usually, in such a steering apparatus, a fixed bracket that supports a steering column is configured as a so-called breakaway bracket that is removed from a vehicle body member when a load that is larger than or equal to a predetermined load and that is directed toward the front of the vehicle is exerted on the fixed bracket (for example, see Japanese Patent Application Publication No. 2006-62434 (JP-A-2006-62434)).

In addition, there is a vehicle steering apparatus that has a so-called telescopic adjustment function that allows the steering wheel position to be adjusted in the axial direction of a steering shaft (for example, see Japanese Patent Application Publication No. 2009-51353 (JP-A-2009-51353)). More specifically, the steering shaft of such a steering apparatus is formed of an upper shaft to which a steering wheel is connected and a lower shaft that is slidable in the axial direction with respect to the upper shaft and is rotatable together with the upper shaft, and the steering column of the steering apparatus is formed of an outer tube and an inner tube that is slidable in the axial direction with respect to the outer tube. In addition, a fixed bracket includes a vehicle body-side bracket, a column-side bracket and a support shaft. The vehicle body-side bracket is fixed to a vehicle body member. The column-side bracket has an axially-long telescopic long hole. The outer tube is fixed to the column-side bracket. The support shaft couples the vehicle body-side bracket to the column-side bracket. The column-side bracket is displaceable with respect to the vehicle body-side bracket within the range of the telescopic long hole. Then, the steering wheel position is adjusted within the range of the telescopic long hole by displacing the outer tube and the upper shaft with respect to the inner tube and the lower shaft and displacing the column-side bracket in the axial direction with respect to the vehicle body-side bracket.

However, in the steering apparatus described in JP-A-2006-62434, after the fixed bracket is removed from the vehicle body member, the vehicle body member no longer supports the steering column via the fixed bracket. Therefore, the steering column (steering wheel) may be displaced excessively downward.

SUMMARY OF THE INVENTION

The invention provides a steering apparatus in which a vehicle body member keeps supporting a steering column even after a fixed bracket is removed from the vehicle body member.

An aspect of the invention relates to a steering apparatus. The steering apparatus includes a steering column that rotatably supports a steering shaft to which a steering wheel is coupled, and a fixed bracket that is fixed to a vehicle body member by a fastening member to support the steering column, wherein the fixed bracket is configured to be removed from the vehicle body member and displaced toward the front of a vehicle when a load that is larger than or equal to a predetermined load and that is directed toward the front of the vehicle is exerted on the fixed bracket. The fixed bracket includes a vehicle body-side bracket that is fixed to the vehicle body member, a column-side bracket to which the steering column is fixed, and a shaft member that couples the vehicle body-side bracket to the column-side bracket. The vehicle body-side bracket has a first through-hole that extends through the vehicle body-side bracket in the axial direction of the steering shaft. The fixed bracket is provided with a guide rail that guides the fixed bracket removed from the vehicle body member toward the front of the vehicle along the axial direction. The guide rail has a body portion and a fixed portion that is fixed to the vehicle body member, wherein the body portion extends from the fixed portion toward the front of the vehicle in the axial direction and is inserted in the first through-hole.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
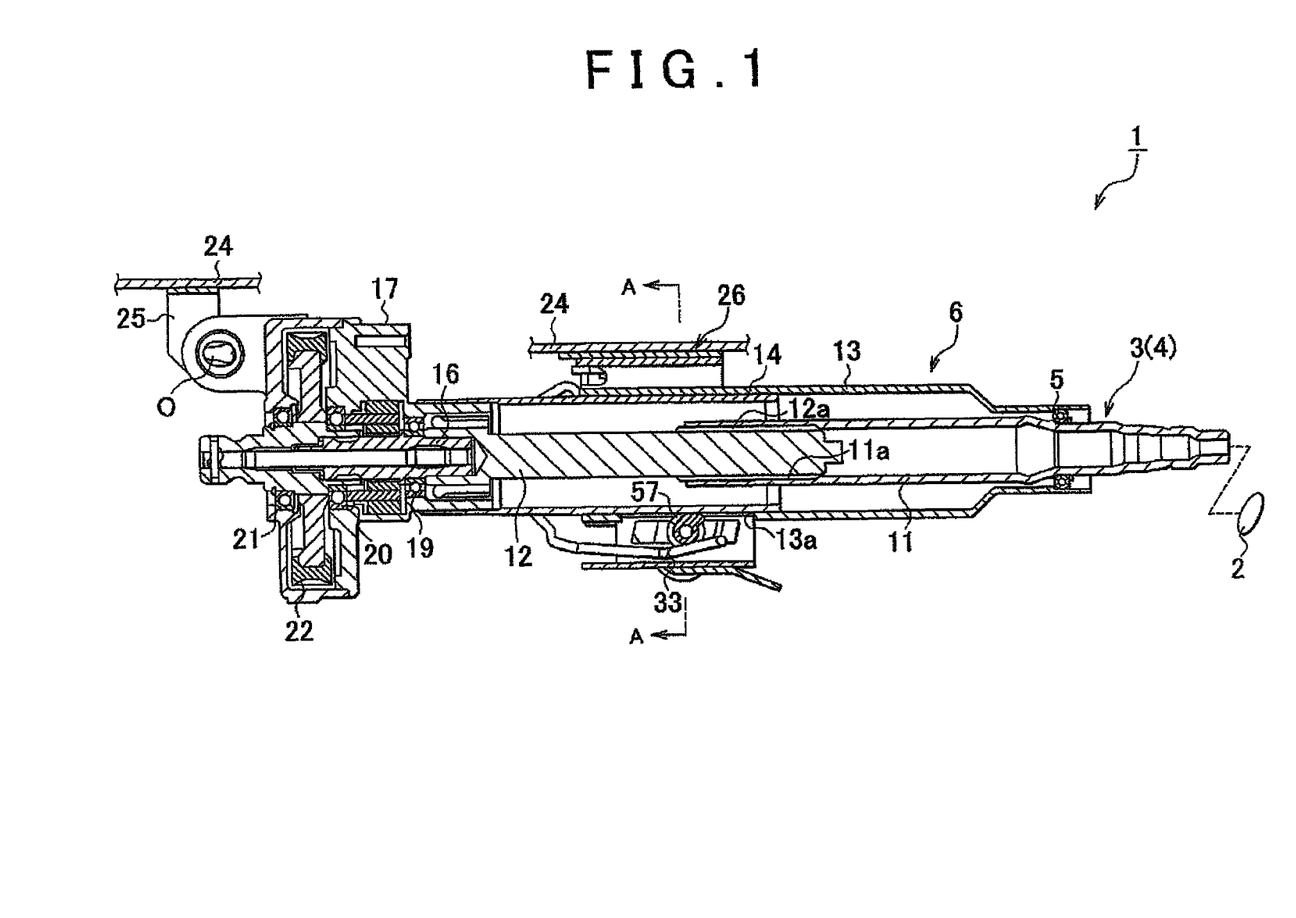
FIG. 1 is an axial cross-sectional view of a steering column of a steering apparatus.

Hereinafter, an embodiment of the invention will be described with reference to the accompanying drawings. As shown in FIG. 1, in a steering apparatus 1, a column shaft 4 is supported by a bearing 5 so as to be rotatably accommodated in a steering column 6. The column shaft 4 constitutes a steering shaft 3. The steering wheel 2 is fixed to a vehicle rear-side end portion (right end portion in FIG. 1) of the steering shaft 3. Then, a vehicle front-side end portion (left end portion in FIG. 1) of the column shaft 4 is coupled to an intermediate shaft (not shown) via a universal joint to thereby transmit rotation and steering torque resulting from the steering operation to a steering mechanism, such as a rack and pinion mechanism. The steering mechanism changes the steered angles of steered wheels (not shown). Note that the steering shaft 3 is mounted on the vehicle so as to be inclined in such a manner that the vehicle front-side end portion is lower than the vehicle rear-side end portion in the vertical direction.

In addition, the steering apparatus 1 has a so-called tilt adjustment function and a so-called telescopic adjustment function. The tilt adjustment function allows the position of the steering wheel 2 (steering wheel position) to be adjusted in the vertical direction. The telescopic adjustment function allows the steering wheel position to be adjusted in the axial direction of the steering shaft 3.

More specifically, the column shaft 4 according to the present embodiment includes a hollow upper shaft 11 and a lower shaft 12. The steering wheel 2 is fixed to the upper shaft 11. The lower shaft 12 is accommodated in the upper shaft 11. A spline fitting portion 11*a* is formed on the inner periphery of the upper shaft 11, and a spline fitting portion 12*a* is formed on the outer periphery of the lower shaft 12. Then, the upper shaft 11 and the lower shaft 12 are spline-fitted to each other so as to be relatively slidable in the axial direction and rotatable together with each other. In addition, the steering column 6 includes an outer tube 13 and an inner tube 14. The outer tube 13 accommodates and supports the upper shaft 11 via the bearing 5. The inner tube 14 accommodates the lower shaft 12. The inner tube 14 is inserted in the inner peripheral side of the outer tube 13, and, thus, the outer tube 13 is slidable in the axial direction with respect to the inner tube 14. That is, the outer tube 13 corresponds to an outer cylinder, and the inner tube 14 corresponds to an inner cylinder.

Note that, in the present embodiment, a housing 17 is provided at a vehicle front-side end of the inner tube 14. The housing 17 accommodates an output shaft 16 of an EPS actuator (not shown) that applies assist force for assisting steering operation to a steering system. The output shaft 16 is coupled to a vehicle front-side end of the lower shaft 12, and is rotatably supported by the housing 17 via bearings 19 to 21. Note that the output shaft 16 constitutes the column shaft 4 together with the upper shaft 11 and the lower shaft 12. A worm wheel 22 is fixed to the output shaft 16. A speed change mechanism is formed of the worm wheel 22 and a worm gear (not shown). The rotation of a motor (not shown) is transmitted to the output shaft 16 via the speed change mechanism to thereby make it possible to apply assist force to the steering system.

The steering column 6 is supported by a lower bracket 25 so as to be tiltable about a tilt center shaft O provided at the housing 17. The lower bracket 25 is fixed to a vehicle front-side portion of a mounting stay 24 that constitutes part of a vehicle body. In addition, the steering column 6 is supported by an upper bracket 26 such that the outer tube 13 is tiltable about the tilt center shaft O and is displaceable in the axial direction. The upper bracket 26 is fixed to a vehicle rear-side of the mounting stay 24.

Figure 2:
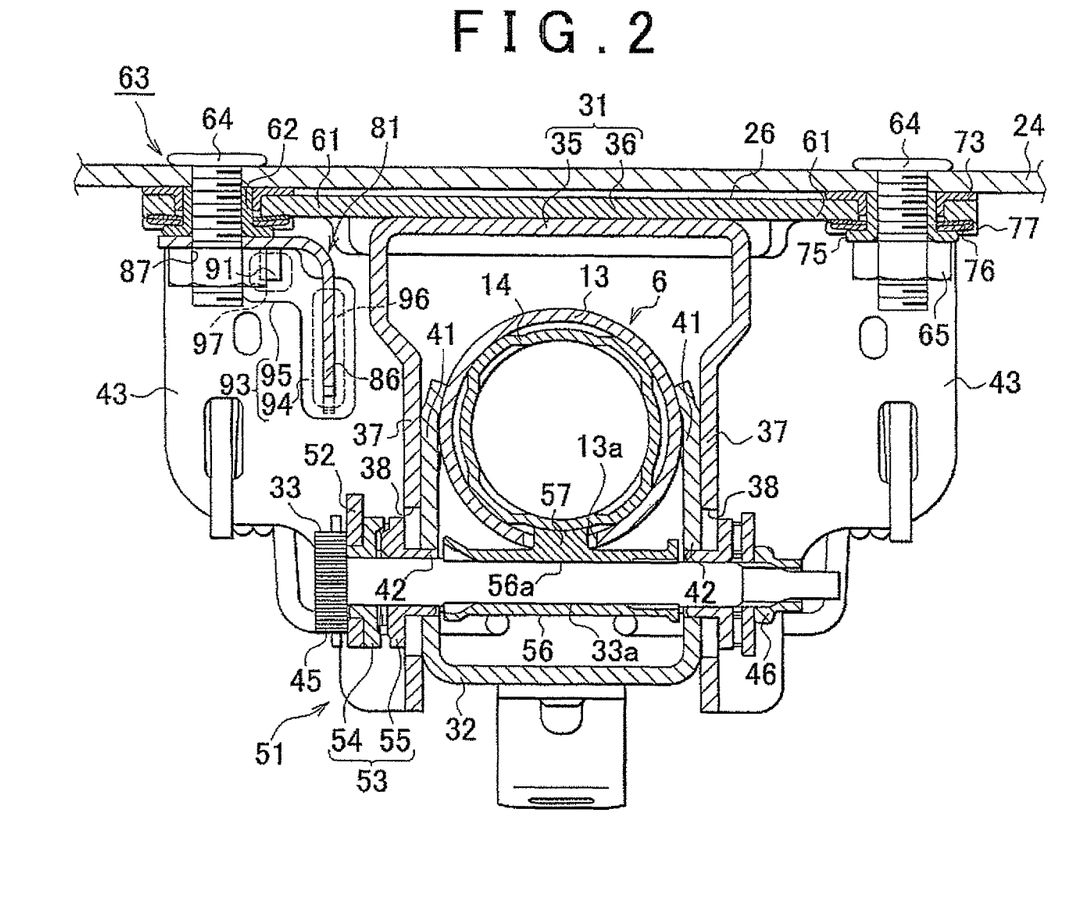
FIG. 2 is a cross-sectional view that is taken along the line A-A in FIG. 1.
Figure 3:
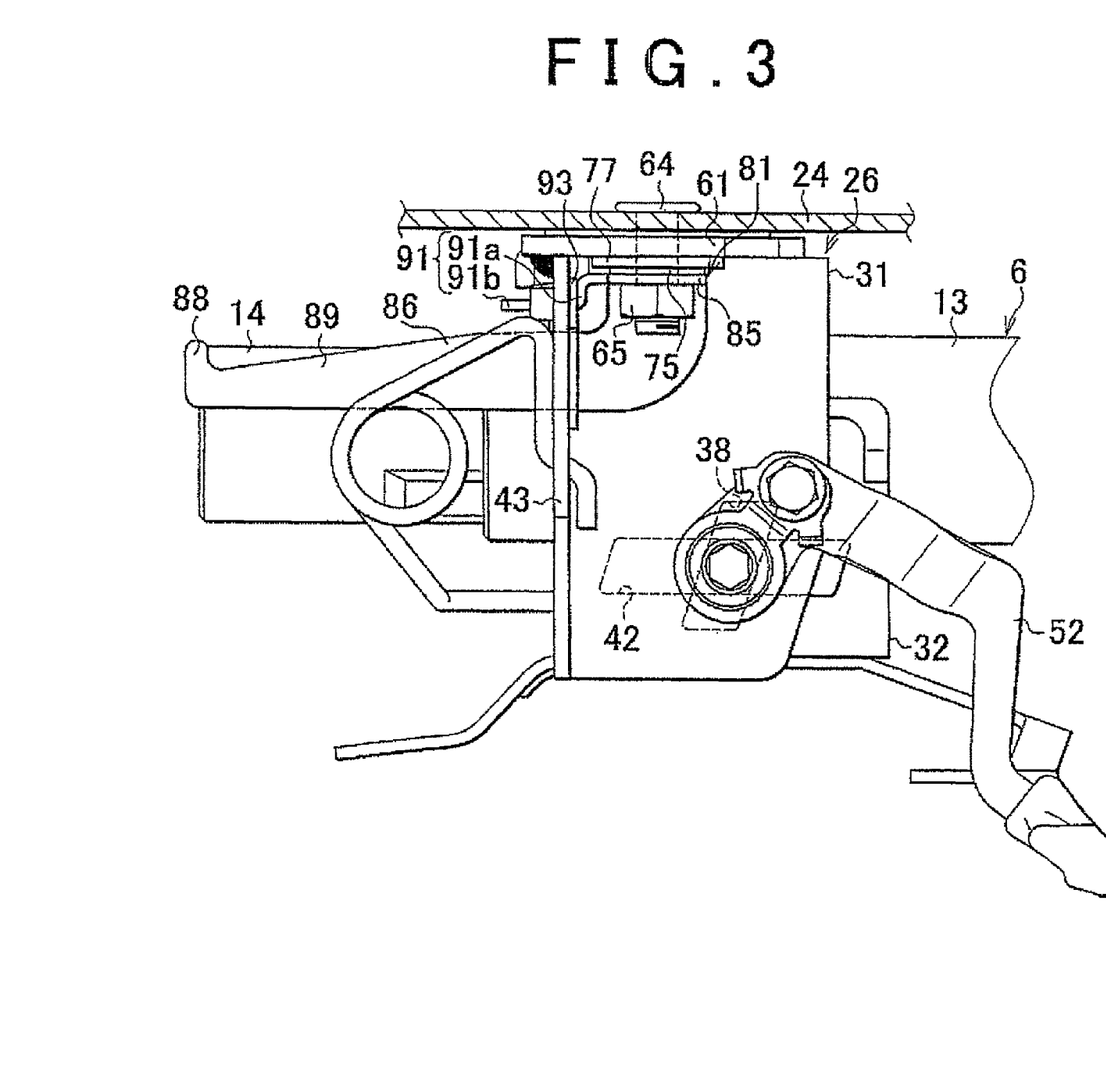
FIG. 3 is a side view of the steering apparatus.

As shown in FIG. 2 and FIG. 3, the upper bracket 26 that serves as a fixed bracket includes a vehicle body-side bracket 31, a column-side bracket 32 and a support shaft 33. The vehicle body-side bracket 31 is fixed to the mounting stay 24. The steering column 6 (Outer tube 13) is fixed to the column-side bracket 32. The support shaft 33 serves as a shaft member couples the vehicle body-side bracket 31 to the column-side bracket 32.

The vehicle body-side bracket 31 is formed of a clamp portion 35 and a planar plate portion 36. The clamp portion 35 has a substantially U-shape in the axial view of the steering shaft 3. The plate portion 36 is fixed to an upper end of the clamp portion 35. Then, the clamp portion 35 has a pair of side plates 37. The pair of side plates 37 respectively have substantially circular arc tilt long holes 38 that are elongated in the direction in which the steering column 6 is tilted. In addition, the column-side bracket 32 has a substantially U-shape in the axial view of the steering shaft 3. The column-side bracket 32 has a pair of side plates 41. The pair of side plates 41 respectively have telescopic long holes 42 that are elongated in the axial direction. Furthermore, the vehicle body-side bracket 31 according to the present embodiment has reinforcement portions 43 in order to ensure the stiffness thereof. The reinforcement portions 43 are formed perpendicularly to the axial direction of the steering shaft 3 and formed on both right and left sides of the side plates 41 (right and left sides in FIG. 2).

The support shaft 33 has a shaft-like shape. The support shaft 33 has a disc-shaped head portion 45 at its base end side (left side in FIG. 2). The head portion 45 extends radially outward. The support shaft 33 couples the vehicle body-side bracket 31 to the column-side bracket 32 when the support shaft 33 is inserted into the tilt long holes 38 and the telescopic long holes 42 formed respectively in the brackets 31 and 32 in a state where the column-side bracket 32 is arranged on the inner side of the vehicle body-side bracket 31. Note that, when a nut 46 is screwed to the tip end side (right side in FIG. 2) of the support shaft 33, the support shaft 33 is fixed to the brackets 31 and 32 so as to be immovable with respect to the brackets 31 and 32 in the axial direction. Thus, the column-side bracket 32 is tiltable about the tilt center shaft O with respect to the vehicle body-side bracket 31 within the range in which the tilt long holes 38 are formed, and is displaceable in the axial direction within the range in which the telescopic long holes 42 are formed. That is, the upper bracket 26 supports the steering column 6 such that the steering column 6 is tiltable within the above range and displaceable in the axial direction within the above range.

In addition, the steering apparatus 1 includes a lock mechanism 51 for retaining the steering wheel position in the vertical direction and in the axial direction. More specifically, the lock mechanism 51 includes an operating lever 52 and a cam mechanism 53. The operating lever 52 is provided so as to be pivotable about the support shaft 33 together with the support shaft 33. The cam mechanism 53 is provided between the head portion 45 of the support shaft 33 and one of the side plates 37 of the clamp portion 35. The cam mechanism 53 presses the side plate 37 toward the axial tip end side (right side in FIG. 2) of the support shaft 33 in accordance with the pivoted position of the operating lever 52 (support shaft 33). Note that the cam mechanism 53 is formed of a first cam member 54 that rotates internally with the support shaft 33 and a second cam member 55 that is rotatable relative to the first cam member 54, and the first cam member 54 and the second cam member 55 are brought into contact with each other or are moved away from each other in accordance with the relative rotational positions of the first and second cam members 54 and 55.

In addition, the lock mechanism 51 includes a substantially cylindrical pressing member 56 that presses the inner tube 14 upward in an up-down direction that is perpendicular to the axial direction of the steering shaft 3 and the vehicle width direction in accordance with the pivoted position of the operating lever 52. A spline fitting portion 33*a* is formed on the outer periphery of the support shaft 33, a spline fitting portion 56*a* is formed on the inner periphery of the pressing member 56. When the pressing member 56 is spline-fitted to the support shaft 33, the pressing member 56 rotates together with the support shaft 33. In addition, the pressing member 56 has a cam portion 57 having a circular arc cross section. The cam portion 57 is formed at a position eccentric to the center of the support shaft 33. The cam portion 57 is in contact with the inner tube 14 via an opening 13a formed at the lower portion of the outer tube 13. The cam portion 57 presses the inner tube 14 in accordance with the pivoted position of the support shaft 33.

When the operating lever 52 is pivoted toward one side in the circumferential direction, the side plates 37 of the vehicle body-side bracket 31 are frictionally engaged with the side plates 41 of the column-side bracket 32 by the cam mechanism 53, and the outer peripheral surface of the inner tube 14 is frictionally engaged with the inner peripheral surface of the outer tube 13 by the pressing member 56. Thus, the column-side bracket 32 is immovable relative to the vehicle body-side bracket 31, and is placed in a lock state where the steering wheel position is unchangeable. On the other hand, when the operating lever 52 is pivoted toward the other side in the circumferential direction, the pressing force of the cam mechanism 53 is no longer applied and the frictional engagement between the side plates 37 of the vehicle body-side bracket 31 and the side plates 41 of the column-side bracket 32 is cancelled. In addition, the pressing force of the pressing member 56 is no longer applied, and the frictional engagement between the inner tube 14 and the outer tube 13 is cancelled. Thus, the column-side bracket 32 is displaceable with respect to the vehicle body-side bracket 31 and is placed in an unlock state where the steering wheel position is changeable.

In the thus configured steering apparatus 1, the steering wheel position is adjustable in the up-down direction within the range of the tilt long holes 38 by placing the lock mechanism 51 in the unlock state and tilting the column-side bracket 32 and the steering column 6 with respect to the vehicle body-side bracket 31. In addition, the steering wheel position is adjustable in the axial direction within the range of the telescopic long holes 42 by displacing the outer tube 13 and the upper shaft 11 with respect to the inner tube 14 and the lower shaft 12 and displacing the column-side bracket 32 in the axial direction with respect to the vehicle body-side bracket 31.

Here, the upper bracket 26 is configured as a so-called breakaway bracket that is removed from the mounting stay 24 when a load that is larger than or equal to a predetermined load and that is directed toward the front of the vehicle is exerted on the upper bracket 26 in order to remove the steering column 6 from the mounting stay 24 that constitutes part of a vehicle body, for example, in the event of a secondary collision. That is, in the present embodiment, the upper bracket 26 is configured as a fixed bracket.

Figure 4:
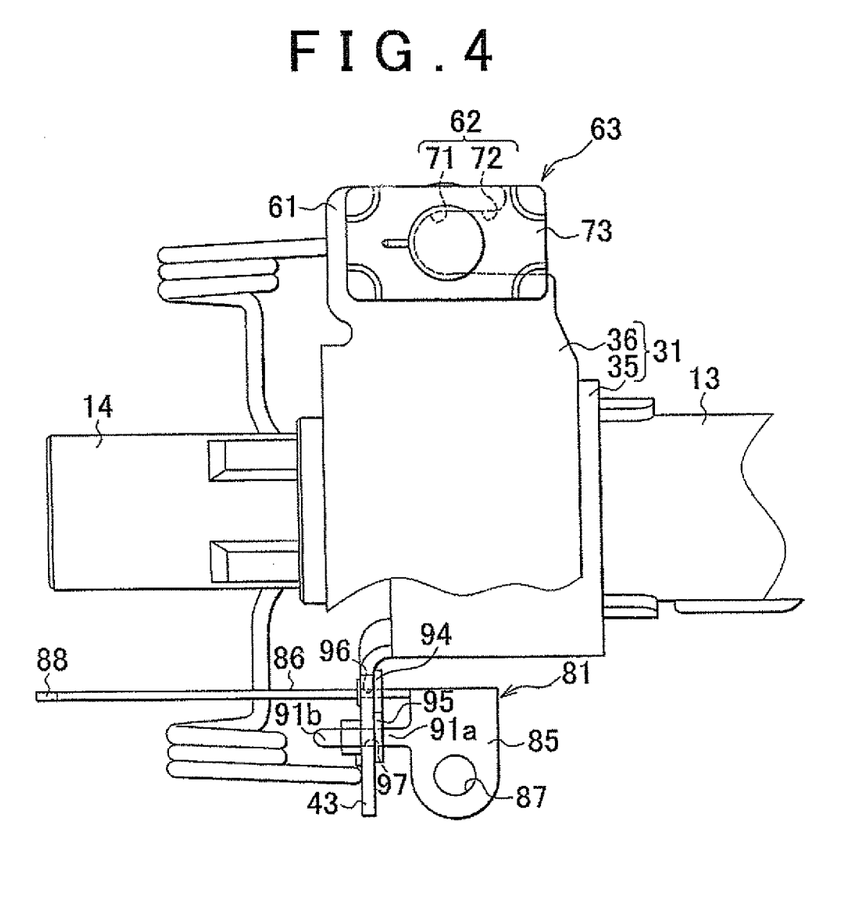
FIG. 4 is a plan view of the steering apparatus with a vehicle body-side bracket being partially cut away.
Figure 5:
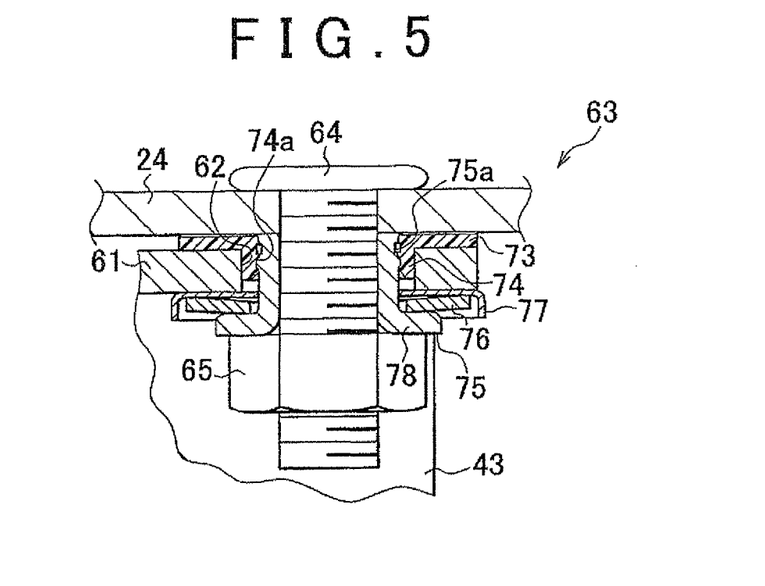
FIG. 5 is an enlarged cross-sectional view that shows a capsule mechanism.

More specifically, as shown in FIG. 4, the plate portion 36 of the vehicle body-side bracket 31 has extended portions 61 that extend toward both sides of the clamp portion 35 in the vehicle width direction (vertical direction in FIG. 4). Each of these extended portions 61 has a fastening hole 62 that is long in the axial direction of the steering shaft 3 and is open to the vehicle rear-side (right side in FIG. 4). As shown in FIG. 5, the upper bracket 26 (vehicle body-side bracket 31) is fixed to the mounting stay 24 when a bolt 64 that protrudes from the mounting stay 24 is inserted in a corresponding one of the fastening holes 62 via a capsule mechanism 63 and a nut 65 is fastened to each bolt 64. That is, the bolts 64 and the nuts 65 constitute a fastening member.

Figure 6:
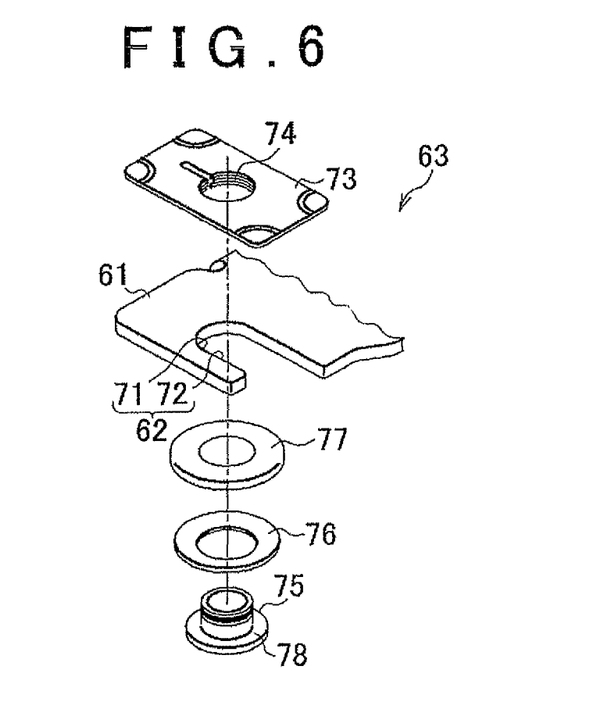
FIG. 6 is an exploded perspective view of the capsule mechanism.

As shown in FIG. 4 and FIG. 6, each fastening hole 62 is formed of a circular portion 71 and a slit portion 72. The circular portion 71 has a substantially circular shape. The slit portion 72 has a belt-like shape having a constant width. The slit portion 72 is contiguous with the circular portion 71 and has the width that is smaller than the diameter of the circular portion 71. On the other hand, as shown in FIG. 5 and FIG. 6, each capsule mechanism 63 includes a planar capsule 73 that is interposed between the upper bracket 26 (plate portion 36) and the mounting stay 24. The capsule 73 has a cylindrical boss portion 74 that is inserted in the circular portion 71 of the fastening hole 62. The outside diameter of the boss portion 74 is substantially equal to the inside diameter of the circular portion 71 of the fastening hole 62, and is larger than the width of the slit portion 72. In addition, each capsule mechanism 63 includes a cylindrical collar 75, an annular disc spring 76 and an annular housing 77. The collar 75 is fitted to the inner periphery of the boss portion 74, and the bolt 64 is inserted in the collar 75. The disc spring 76 is fitted around the collar 75. The housing 77 accommodates the disc spring 76. An annular flange portion 78 is formed at the lower end of the collar 75. The flange portion 78 extends radially outward. The end portion of the disc spring 76 is in contact with the flange portion 78. Then, each capsule mechanism 63 is fixed to the mounting stay 24 with the disc spring 76 elastically deformed when the nut 65 is screwed to the end side of the bolt 64. Due to the urging force of the disc springs 76, friction force corresponding to the urging force is exerted between each capsule 73 and the plate portion 36 and mounting stay 24 when the upper bracket 26 is removed.

An engagement protruding portion 74a is formed on the inner peripheral surface of the boss portion 74, and an engagement groove 75a is formed at the upper end of the collar 75. The engagement protruding portion 74a protrudes radially inward. The engagement protruding portion 74a is engaged with the engagement groove 75a. When the engagement protruding portion 74a of the boss portion 74 is brought into engagement with the engagement groove 75a of the collar 75, the capsule mechanism 63 is fixed to the upper bracket 26 in a state before the steering apparatus 1 is assembled to the vehicle. Thus, when the steering apparatus 1 is moved in a state before it is assembled to the vehicle, each capsule mechanism 63 does not slip off.

Then, when a load that is larger than or equal to a predetermined load and that is directed toward the front of the vehicle is exerted on the upper bracket 26, the upper bracket 26 is removed toward the front of the vehicle in the axial direction of the steering shaft in a state where the capsule mechanisms 63 remain on the vehicle body member. Note that the predetermined load is a load that is required to displace the upper bracket 26 against resistance generated when the boss portion 74 of each capsule 73 passes through the slit portion 72 of a corresponding one of the fastening holes 62 and the friction force generated between the upper bracket 26 and the capsules 73 in accordance with the urging force of the disc springs 76.

After the upper bracket 26 is removed from the mounting stay 24 that is the vehicle body member, the mounting stay 24 no longer supports the steering column 6 via the upper bracket 26.

Then, as shown in FIG. 2 to FIG. 4 and FIG. 7, the steering apparatus 1 according to the present embodiment includes a guide rail 81 in order to maintain a state where the upper bracket 26 is supported by the mounting stay 24 even after the upper bracket 26 is removed from the mounting stay 24.

Figure 7:
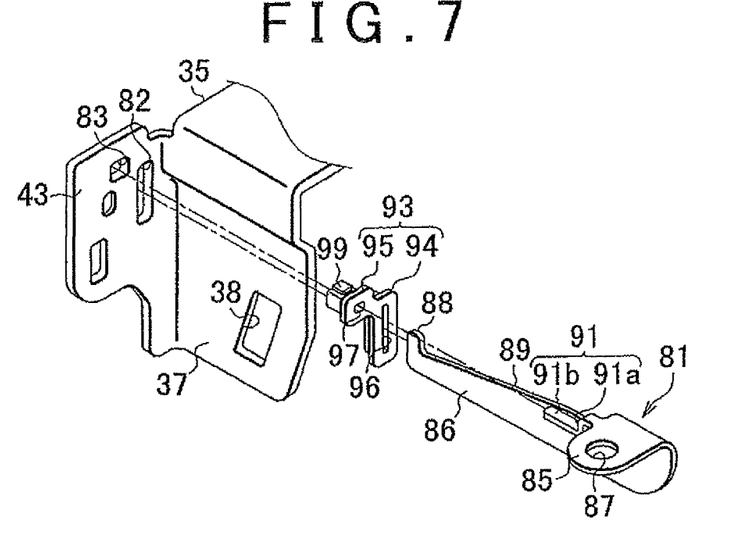
FIG. 7 is an exploded perspective view that shows a guide rail, a retaining rubber and the vehicle body-side bracket.
Figure 8A:
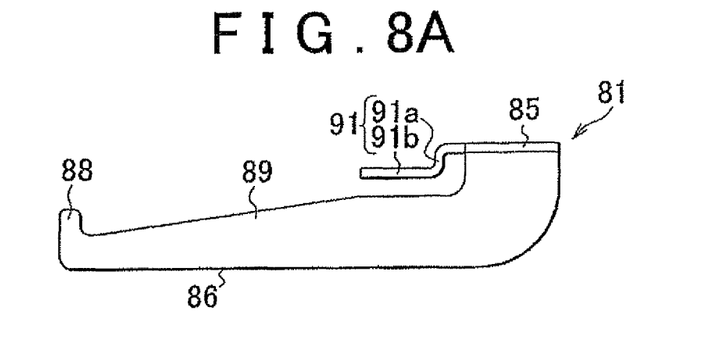
FIG. 8A is a side view of the guide rail.
Figure 8B:
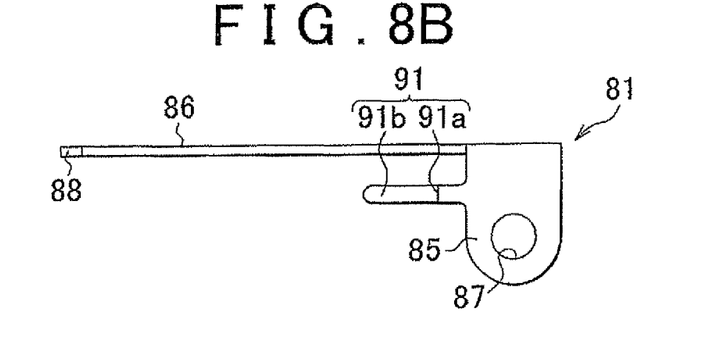
FIG. 8B is a plan view of the guide rail.

More specifically, as shown in FIG. 2 and FIG. 7, the reinforcement portion 43 of the vehicle body-side bracket 31 has a first through-hole 82 and a second through-hole 83. The first through-hole 82 and the second through-hole 83 extend through the vehicle body-side bracket 31 in the axial direction of the steering shaft 3. The first through-hole 82 has a rectangular shape that is long in the up-down direction, and the second through-hole 83 has a substantially square shape.

As shown in FIG. 2, FIG. 3, FIG. 8A and FIG. 8B, the guide rail 81 has a planar fixed portion 85 and a body portion 86. The fixed portion 85 is fixed to the mounting stay 24. The body portion 86 extends from the fixed portion 85 toward the front-side of the vehicle (left side in FIG. 3) in the axial direction. In the present embodiment, the fixed portion 85 has a bolt hole 87 through which the bolt 64 is inserted. The bolt hole 87 is arranged coaxially with one of the circular portions 71 of the fastening holes 62 so that the fixed portion 85 is fixed to the mounting stay 24 together with a corresponding one of the capsule mechanisms 63. On the other hand, the body portion 86 has a planar shape that is parallel to the up-down direction, and is formed so as to be inserted in the first through-hole 82 in a state where the bolt 64 is inserted in the fixed portion 85. In addition, a hook portion 88 is formed at a vehicle front-side end portion of the body portion 86. The upper bracket 26 is engaged with the hook portion 88 when the upper bracket 26 is removed from the mounting stay 24. Specifically, the upper end portion 89 of the body portion 86, which is the upper side in the up-down direction, is inclined downward toward the front of the vehicle. Thus, the length of the body portion 86 in the up-down direction reduces toward the front of the vehicle in the axial direction. The hook portion 88 is formed so as to protrude upward in the up-down direction from the vehicle front-side end portion of the body portion 86.

Furthermore, the guide rail 81 according to the present embodiment has a positioning assist portion 91 that extends from the front end portion of the fixed portion 85 toward the front of the vehicle in the axial direction. The positioning assist portion 91 is formed of a positioning portion 91a and an inserted portion 91b. The positioning portion 91a extends from the fixed portion 85 toward the front of the vehicle and then extends downward in the up-down direction. The inserted portion 91b extends from the lower end of the positioning portion 91a toward the front of the vehicle. The positioning portion 91a is formed such that when the positioning portion 91a contacts the reinforcement portion 43 of the vehicle body-side bracket 31 from the rear-side in the longitudinal direction of the vehicle via a retaining rubber 93 (described later), the bolt hole 87 of the fixed portion 85 is arranged coaxially with the circular portion 71 of the fastening hole 62. In addition, the inserted portion 91b has a long narrow planar shape that is perpendicular to the body portion 86, and is formed so as to be inserted in the second through-hole 83 in a state where the bolt 64 is inserted in the bolt hole 87 of the fixed portion 85.

In addition, in the present embodiment, the retaining rubber 93 made of an elastic material, such as synthetic rubber and resin material, is provided between the guide rail 81 and the first and second through-holes 82 and 83 of the upper bracket 26. The retaining rubber 93 maintains the relative position of the guide rail 81 with respect to the upper bracket 26 before the upper bracket 26 is fixed to the mounting stay 24, at a mounting position at which these upper bracket 26 and guide rail 81 are allowed to be fixed to the mounting stay 24, that is, a relative position at which the bolt hole 87 of the fixed portion 85 is arranged coaxially with the circular portion 71 of the fastening hole 62.

More specifically, the retaining rubber 93 is formed by forming a first retaining portion 94 and a second retaining portion 95 integrally with each other. The first retaining portion 94 serves as a first retaining member and is inserted in the first through-hole 82. The second retaining portion 95 serves as a second retaining member and is inserted in the second through-hole 83. Then, the first retaining portion 94 has a first press-fitting hole 96 in which the body portion 86 of the guide rail 81 is lightly press-fitted, and the second retaining portion 95 has a second press-fitting hole 97 in which the inserted portion 91b (positioning assist portion 91) of the guide rail 81 is lightly press-fitted.

Figure 9:
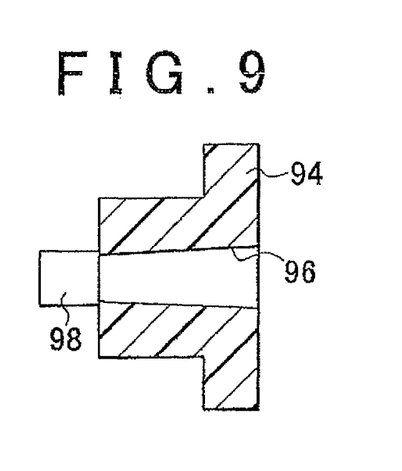
FIG. 9 is a cross-sectional view that is taken along the line B-B in FIG. 10.

Specifically, as shown in FIG. 9, the vehicle rear-side width (width in the vertical direction in FIG. 9) of the first press-fitting hole 96 of the first retaining portion 94 is substantially equal to the thickness of the body portion 86, and the width of the first press-fitting hole 96 reduces toward the front of the vehicle. In addition, similarly, the vehicle rear-side width of the second press-fitting hole 97 of the second retaining portion 95 is substantially equal to the thickness of the positioning assist portion 91, and the width of the second press-fitting hole 97 reduces toward the front of the vehicle. In this way, the body portion 86 and the inserted portion 91b are respectively press-fitted in the first and second press-fitting holes 96 and 97 to thereby maintain the relative position of the upper bracket 26 with respect to the guide rail 81. Note that the body portion 86 and positioning assist portion 91 of the guide rail 81 are respectively lightly press-fitted, so this scarcely influences a load required when the upper bracket 26 is removed from the mounting stay 24.

Figure 10:
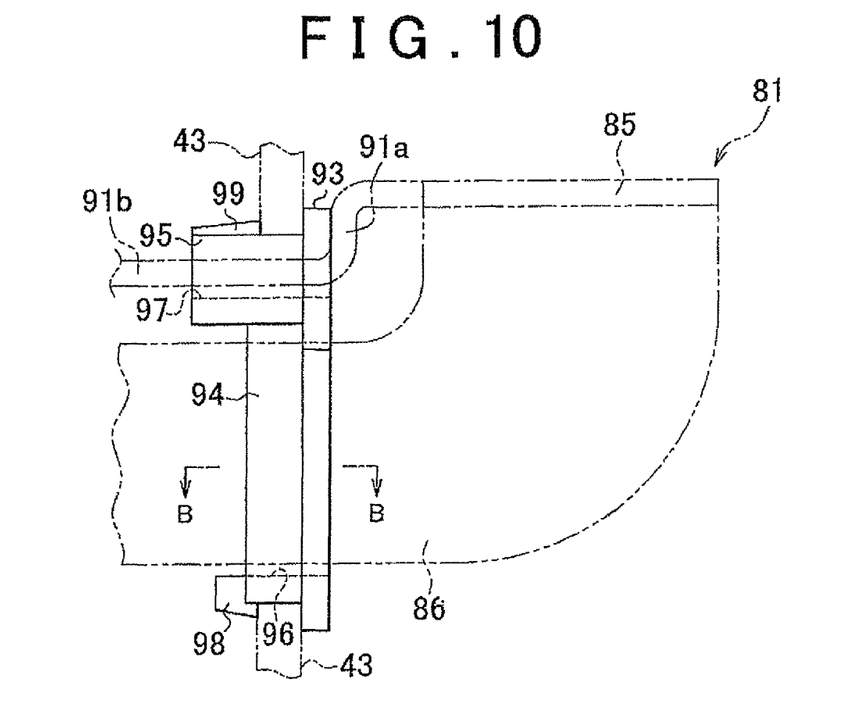
FIG. 10 is a view that illustrates a state where the guide rail is inserted in press-fitting holes of the retaining rubber.

In addition, the first retaining portion 94 has a substantially rectangular parallelepiped shape corresponding to the first through-hole 82, and has an engaging lug 98 at a vehicle front-side portion in the lower end portion thereof. The engaging lug 98 protrudes downward in the up-down direction. On the other hand, the second retaining portion 95 has a substantially cubular shape corresponding to the second through-hole 83, and has an engaging lug 99 at a vehicle front-side portion in the upper end portion thereof. The engaging lug 99 protrudes upward in the up-down direction. Then, as shown in FIG. 10, the retaining rubber 93 is fixed to the vehicle body-side bracket 31 when the first retaining portion 94 is inserted in the first through-hole 82 to engage the engaging lug 98 with the reinforcement portion 43 and the second retaining portion 95 is inserted in the second through-hole 83 to engage the engaging lug 99 with the reinforcement portion 43. The length of the first press-fitting hole 96 in the up-down direction is larger than the length of the body portion 86 of the guide rail 81 in the up-down direction, and the length of the second press-fitting hole 97 in the up-down direction is larger than the length of the positioning assist portion 91 of the guide rail 81 in the up-down direction. Thus, when the steering apparatus 1 is assembled to the vehicle, the guide rail 81 is displaceable in the up-down direction by the amount by which the disc spring 76 is elastically deformed (compressed) when the nuts 65 are respectively screwed to the bolts 64.

Figure 11A:
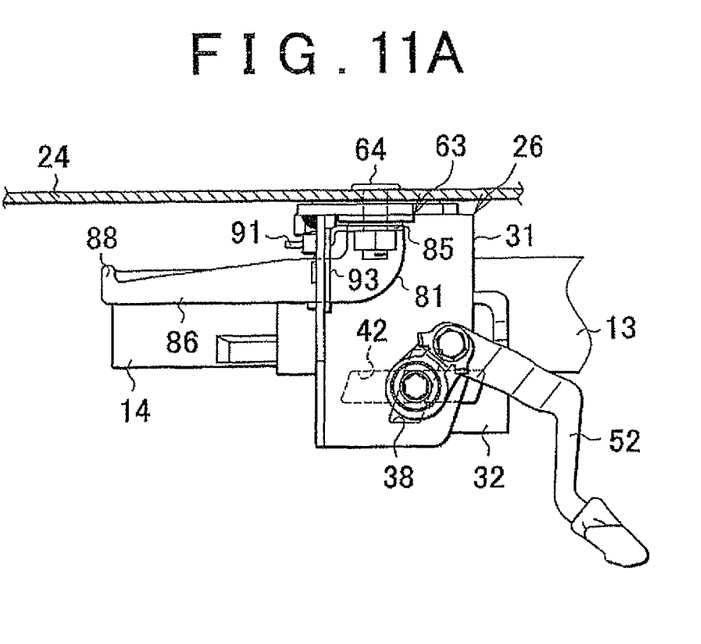
FIG. 11A to FIG. 11C are views that illustrate the operation of an upper bracket before and after the upper bracket is removed.
Figure 11B:
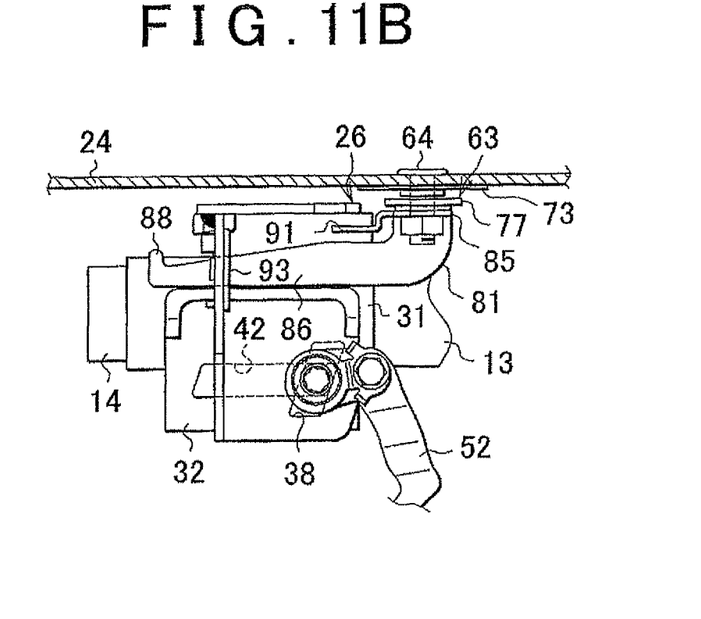

Next, the operation of the steering apparatus 1 according to the present embodiment will be described. As shown in FIG. 11A, in a state before the upper bracket 26 is removed, the upper bracket 26 is fixed to the mounting stay 24 via the capsule mechanisms 63, and the mounting stay 24 supports the steering column 6 (outer tube 13) via the upper bracket 26. Here, when a load that is larger than or equal to a predetermined load and that is directed toward the front of the vehicle is exerted on the upper bracket 26 as described above, the upper bracket 26 is removed from the mounting stay 24 as shown in FIG. 11B.

Figure 11C:
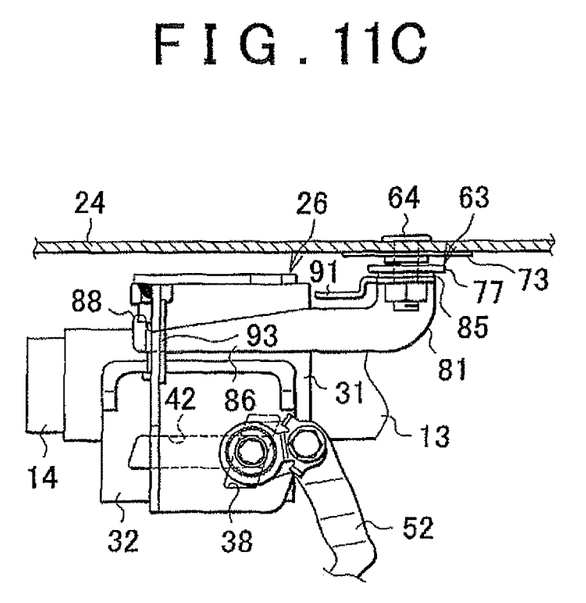

At this time, because the body portion 86 of the guide rail 81 fixed to the mounting stay 24 is inserted in the first through-hole 82 of the vehicle body-side bracket 31 via the first retaining portion 94, the upper bracket 26 is displaced in the longitudinal direction (axial direction) of the body portion 86. Then, as shown in FIG. 11C, the upper bracket 26 contacts the hook portion 88 of the guide rail 81, and further displacement of the upper bracket 26 toward the front-side of the vehicle (left side in FIG. 11C) is restricted. Because the body portion 86 of the guide rail 81 fixed to the mounting stay 24 is inserted in the first through-hole 82 of the upper bracket 26 as described above, the mounting stay 24 supports the upper bracket 26 via the guide rail 81. Thus, even after the upper bracket 26 is removed, the steering column 6 remains supported by the mounting stay 24 via the guide rail 81, and therefore the steering column 6 is not displaced excessively downward.

Then, after the upper bracket 26 is removed, even when the steering column 6 is displaced toward the rear-side of the vehicle along the body portion 86 of the guide rail 81 due to, for example; reaction due to a secondary collision, or the like, the upper bracket 26 contacts the capsule mechanisms 63, the bolts 64 and the nuts 65. Thus, displacement of the steering column 6 (steering wheel 2) toward the rear-side of the vehicle is stopped.

As described in detail above, according to the present embodiment, the following operation and advantageous effects may be obtained.

(1) In the steering apparatus 1, the upper bracket 26 that supports the steering column 6 is configured as a breakaway bracket, and has the telescopic adjustment function that allows the steering wheel position to be adjusted in the axial direction. The first through-hole 82 is formed in the upper bracket 26 so as to extend through the upper bracket 26 in the axial direction. The upper bracket 26 is provided with the guide rail 81 that has the fixed portion 85 and the body portion 86. The fixed portion 85 is fixed to the mounting stay 24. The body portion 86 extends from the fixed portion 85 toward the front of the vehicle in the axial direction, and is inserted in the first through-hole 82.

With the above configuration, even when the upper bracket 26 is removed from the mounting stay 24 and displaced toward the front of the vehicle, the body portion 86 of the guide rail 81 is inserted in the first through-hole 82, and therefore the upper bracket 26 is supported by the mounting stay 24 via the guide rail 81. Thus, even after the upper bracket 26 is removed, the steering column 6 may remain supported by the mounting stay 24 via the guide rail 81. Accordingly, it is possible to prevent excessive downward displacement of the steering column 6.

Then, even when the steering column 6 is displaced toward the rear-side of the vehicle along the body portion 86 of the guide rail 81 due to, for example, reaction caused by a secondary collision, or the like, the upper bracket 26 contacts the capsule mechanisms 63, the bolts 64 and the nuts 65. Thus, it possible to stop displacement of the steering column 6 (steering wheel 2) toward the rear-side of the vehicle. In addition, because the body portion 86 extends from the fixed portion 85 toward the front of the vehicle, even when external force is exerted on the steering column 6 in a state where the upper bracket 26 is located at a vehicle rear-side portion in the body portion 86 and therefore a large load is exerted on the body portion 86, the body portion 86 is not deformed easily, and the upper bracket 26 reliably contacts the capsule mechanisms 63, the bolts 64 and the nuts 65. Therefore, it is possible to reliably stop displacement of the steering column 6 (steering wheel 2) toward the rear-side of the vehicle. Furthermore, even after the upper bracket 26 is removed, the steering column 6 remains supported at two portions by the mounting stay 24 via the lower bracket 25 and the guide rail 81. Therefore, it is possible to stably support the steering column 6.

(2) The hook portion 88 with which the removed upper bracket 26 is engaged is formed at the vehicle front-side end portion of the body portion 86. Therefore, the upper bracket 26 is displaced toward the front of the vehicle after it is removed and is then engaged with the hook portion 88. Thus, further displacement of the upper bracket 26 toward the front of the vehicle is restricted. Therefore, it is possible to prevent the upper bracket 26 from slipping off from the guide rail 81, and to reliably prevent excessive downward displacement of the steering column 6. In addition, with the above configuration, because the upper bracket 26 contacts the hook portion 88, the upper bracket 26 is prevented from slipping off from the guide rail 81. Thus, for example, in comparison with the case where the body portion 86 is elongated in the axial direction beyond the range in which displacement of the upper bracket 26 supported by the guide rail 81 is restricted when the upper bracket 26 contacts another member that constitutes the vehicle, it is possible to reliably prevent excessive downward displacement of the steering column 6 and to reduce the axial length of the body portion 86.

(3) The upper bracket 26 has the second through-hole 83 that extends through the upper bracket 26 in the axial direction in addition to the first through-hole 82, and the guide rail 81 has the positioning assist portion 91 (inserted portion 91b) that extends toward the front of the vehicle in the axial direction and is then inserted in the second through-hole 83. In addition, the retaining rubber 93 made of an elastic material is provided. The retaining rubber 93 is formed by forming the first retaining portion 94 fitted in the first through-hole 82 and the second retaining portion 95 fitted in the second through-hole 83 integrally with each other. Then, the first retaining portion 94 has the first press-fitting hole 96 in which the body portion 86 is lightly press-fitted, and the second retaining portion 95 has the second press-fitting hole 97 in which the positioning assist portion 91 (inserted portion 91b) is lightly press-fitted.

Here, after the steering apparatus 1 is manufactured and before the steering apparatus 1 assembled to the vehicle body member, vibrations, or the like, are exerted on the steering apparatus 1 while the steering apparatus 1 is moved (transported) and, as a result, the relative position of the guide rail 81 with respect to the upper bracket 26 may be changed. Therefore, even when the steering apparatus 1 is manufactured such that the relative position of the guide rail 81 with respect to the upper bracket 26 before the upper bracket 26 is fixed to the mounting stay 24 is set as the mounting position, the relative position of the guide rail 81 with respect to the upper bracket 26 needs to be adjusted again when the steering apparatus 1 is assembled to the vehicle body member. Therefore, the assembling efficiency may decrease. In terms of this point, with the above configuration, the body portion 86 is lightly press-fitted in the first press-fitting hole 96, and the positioning assist portion 91 is lightly press-fitted in the second press-fitting hole 97. Therefore, the guide rail 81 is supported at two portions by the upper bracket 26. Therefore, vibrations, or the like, generated when the steering apparatus 1 is moved scarcely causes changes in the relative position of the guide rail 81 with respect to the upper bracket 26. Accordingly, it is possible to suppress a decrease in the efficiency of assembling the steering apparatus 1 to the vehicle body member. In addition, because the first and second retaining portions 94 and 95 each are made of an elastic material, a load exerted when the body portion 86 is press-fitted into the first press-fitting hole 96 (press-fitting load) and a press-fitting load of the positioning assist portion 91 are easily reduced and are easily adjusted. Furthermore, because an elastic material is interposed between the body portion 86 and the first through-hole 82 and between the positioning assist portion 91 and the second through-hole 83, it is possible to prevent noise due to contact of the body portion 86 and positioning assist portion 91 with the upper bracket 26 resulting from vibrations during vehicle running, or the like. Because the first retaining portion 94 and the second retaining portion 95 are integrally formed with each other, it is possible to suppress an increase in the number of components.

(4) The body portion 86 of the guide rail 81 has a planar shape parallel to the up-down direction, and the positioning assist portion 91 has a planar shape perpendicular to the body portion 86. Therefore, vibrations, or the like, generated when the steering apparatus 1 is moved scarcely causes changes in the relative position of the guide rail 81 with respect to the upper bracket 26 and, as a result, it is possible to further suppress a decrease in the efficiency of assembling the steering apparatus 1 to the vehicle body member.

(5) The guide rail 81 has the positioning portion 91a that contacts the reinforcement portion 43 of the vehicle body-side bracket 31 from the rear-side in the longitudinal direction of the vehicle via the retaining rubber 93 to set the relative position of the guide rail 81 with respect to the upper bracket 26 to the mounting position. With the above configuration, the relative position of the guide rail 81 with respect to the upper bracket 26 may be easily adjusted to the mounting position.

Note that the above embodiment may be appropriately modified into the following alternative embodiments.

In the above embodiment, the guide rail 81 is fixed to the bolt 64 that is used to fix the upper bracket 26 to the mounting stay 24. However, the aspect of the invention is not limited to this configuration. Another bolt may be provided at the mounting stay 24 and then the guide rail 81 may be fixed to that bolt.

In the above embodiment, the hook portion 88 is formed to protrude upward in the up-down direction from the vehicle front-side end portion of the body portion 86. However, the aspect of the invention is not limited to this configuration. For example, the hook portion may be configured to be detachable from the body portion 86 and the hook portion may be attached to the vehicle front-side end portion of the body portion 86 after the body portion 86 is inserted through the first through-hole 82.

In the above embodiment, the upper end portion 89 of the body portion 86 of the guide rail 81 is formed to be inclined downward in the up-down direction toward the front of the vehicle, and the hook portion 88 is formed at the vehicle front-side end portion of the guide rail 81 so as to protrude upward in the up-down direction. However, the aspect of the invention is not limited to this configuration. For example, the length of the guide rail 81 in the up-down direction may be constant and the guide rail 81 may have a rectangular shape parallel to the axial direction. Note that, in this case, preferably, the body portion 86 is formed to be longer in the axial direction than the range in which the upper bracket 26 is displaceable within the vehicle in a state where the upper bracket 26 is supported by the guide rail 81.

In the above embodiment, the inserted portion 91b of the positioning assist portion 91 and the second press-fitting hole 97 of the second retaining portion 95 may be omitted and the positioning portion 91a of the positioning assist portion 91 may contact the second retaining portion 95.

In the above embodiment, the retaining rubber 93 formed of the first retaining portion 94 and second retaining portion 95 that are formed integrally with each other is used. However, the aspect of the invention is not limited to this configuration. Two separate retaining rubbers, that is, the first retaining portion 94 and the second retaining portion 95 that are separate members, may be used.

In the above embodiment, the guide rail 81 has the positioning assist portion 91, and the reinforcement portion 43 of the vehicle body-side bracket 31 has the second through-hole 83. However, the aspect of the invention is not limited to this configuration. The guide rail 81 may have only the body portion 86 and the vehicle body-side bracket 31 has no second through-hole 83. Then, in this configuration, a retaining rubber that has only the first retaining portion 94 may be fitted to the first through-hole 82.

In the above embodiment, because the vehicle rear-side width of the first press-fitting hole 96 is substantially equal to the thickness of the body portion 86 and is reduced toward the front of the vehicle, the body portion 86 is lightly press-fitted in the first press-fitting hole 96. However, the aspect of the invention is not limited to this configuration. As long as the body portion 86 is lightly press-fitted in the first press-fitting hole 96, the first press-fitting hole 96 may have any shape. For example, a protrusion may be formed on the inner surface of the first press-fitting hole 96. Similarly, as long as the positioning assist portion 91 is lightly press-fitted in the second press-fitting hole 97, the second press-fitting hole 97 may have any shape.

In the above embodiment, the body portion 86 is lightly press-fitted in the first press-fitting hole 96 of the first retaining portion 94, and the positioning assist portion 91 is lightly press-fitted in the second press-fitting hole 97 of the second retaining portion 95. However, the aspect of the invention is not limited to this configuration. The retaining rubber 93 may be omitted, and the body portion 86 may be loosely inserted in the first through-hole 82 and the positioning assist portion 91 may be loosely inserted in the second through-hole 83.

In the above embodiment, the aspect of the invention is applied to the steering apparatus that has a tilt adjustment function and a telescopic adjustment function. However, the aspect of the invention is not limited to this configuration. The aspect of the invention may be applied to a steering apparatus that has only a telescopic adjustment function or only a tilt adjustment function.

In the above embodiment, the steering apparatus 1 is configured as a so-called column assist-type electric power steering (EPS) that applies assist force to the output shaft 16 that constitutes the column shaft 4. However, the aspect of the invention is not limited to this configuration. For example, the aspect of the invention may be applied to an EPS, other than a column assist-type EPS, such as a so-called rack assist-type EPS, a hydraulic power steering apparatus or a non-assist-type steering apparatus.

What is claimed is:

1. A steering apparatus, comprising:
a steering column that rotatably supports a steering shaft to which a steering wheel is coupled; and
a fixed bracket that is fixed to a vehicle body member by a fastening member to support the steering column, that is configured to be removed from the vehicle body member and displaced toward a front of a vehicle when a load that is larger than or equal to a predetermined load and that is directed toward the front of the vehicle is exerted on the fixed bracket, and that includes a vehicle body-side bracket that is fixed to the vehicle body member, a column-side bracket to which the steering column is fixed, and a shaft member that couples the vehicle body-side bracket to the column-side bracket, wherein
the vehicle body-side bracket has a first through-hole that extends through the vehicle body-side bracket in an axial direction of the steering shaft, the fixed bracket is provided with a guide rail that guides the fixed bracket removed from the vehicle body member toward the front of the vehicle along the axial direction;

the guide rail has a body portion and a fixed portion that is fixed to the vehicle body member, wherein the body portion extends from the fixed portion toward the front of the vehicle in the axial direction and is inserted in the first through-hole;

a hook portion is formed at a vehicle front-side end portion of the body portion; and the hook portion is configured such that the fixed bracket removed from the vehicle body member is engaged with the hook portion.

2. The steering apparatus according to claim 1, further comprising a first retaining member that is inserted in the first through-hole, wherein the first retaining member is made of an elastic material and has a first press-fitting hole, and the first press-fitting hole is formed such that the body portion is lightly press-fitted in the first press-fitting hole.

3. The steering apparatus according to claim 1, wherein:

the guide rail has a positioning portion, the positioning portion contacts the vehicle body-side bracket from a rear-side in a longitudinal direction of the vehicle to thereby set a relative position of the guide rail with respect to the fixed bracket, and the set relative position is used as a mounting position at which the fixed bracket and the guide rail are fixed to the vehicle body member.

* * * * *